(12) United States Patent
Cvijetic et al.

(10) Patent No.: US 10,116,590 B2
(45) Date of Patent: Oct. 30, 2018

(54) NETWORK VIRTUALIZATION AND RESOURCE ALLOCATION FOR THE INTERNET OF THINGS

(71) Applicant: NEC Laboratories America, Inc., Princeton, NJ (US)

(72) Inventors: Neda Cvijetic, San Jose, CA (US); Konstantinos Kanonakis, New Brunswick, NJ (US); Ting Wang, West Windsor, NJ (US); Jing Wang, Atlanta, NJ (US)

(73) Assignee: NEC Corporation (JP)

( * ) Notice: Subject to any disclaimer, the term of this patent is extended or adjusted under 35 U.S.C. 154(b) by 497 days.

(21) Appl. No.: 14/845,078

(22) Filed: Sep. 3, 2015

(65) Prior Publication Data

US 2016/0105376 A1   Apr. 14, 2016

Related U.S. Application Data

(60) Provisional application No. 62/062,986, filed on Oct. 13, 2014.

(51) Int. Cl.
*H04L 12/911* (2013.01)
*H04L 12/26* (2006.01)
*H04L 29/08* (2006.01)

(52) U.S. Cl.
CPC ............ *H04L 47/821* (2013.01); *H04L 43/08* (2013.01); *H04L 67/12* (2013.01)

(58) Field of Classification Search
CPC ....... H04L 47/821; H04L 67/12; H04L 43/08; H04L 12/911; H04L 12/26; H04L 29/08;
(Continued)

(56) References Cited

U.S. PATENT DOCUMENTS 8,265,676 B2 * 9/2012 Omar ................... H04W 28/18
370/238
9,461,877 B1 * 10/2016 Nadeau .................. H04L 41/12
(Continued)

OTHER PUBLICATIONS

NPL document: Best Practices in Data Integration: Advanced Data Management, Author: Nancy Rausch et al., Published by SAS Global Forum 2011, pp. 1-15 (Year: 2011).*

Cvijetic, et al., "First OpenFlow-based Software-Defined λ-Flow Architecture for Flex-Grid OFDMA Mobile Backhaul Over Passive Optical Networks with Filterless Direct Detection ONUs", OFC/NFOEC, Mar. 2013, pp. 1-3.
(Continued)

*Primary Examiner* — Backhean Tiv
*Assistant Examiner* — Mehulkumar Shah
(74) *Attorney, Agent, or Firm* — Joseph Kolodka

(57) ABSTRACT

A system and method for network virtualization and resource allocation, including storing one or more received network requests in a request table, and updating at least one of a flow table, a waiting list table, or a candidate group map based on the one or more received network requests. The updating includes monitoring a transmission progress of each of one or more flows in a network of interconnected computing devices and moving completed flows from the flow table to a success list, moving requests in the waiting list table which have reached an attempt threshold from the flow table to a fail list, and compiling any residual requests in the waiting list with new requests to generate a new request table. A deterministic request allocation and/or an optimizing request allocation is performed based on the new request table.

12 Claims, 8 Drawing Sheets

(58) Field of Classification Search
CPC ... H04L 29/08072; H04L 29/06; H04L 43/00;
H04L 12/2602; H04L 41/22
USPC .......................... 709/224; 370/224; 714/39
See application file for complete search history.

(56) References Cited

U.S. PATENT DOCUMENTS

| | | | |
|---|---|---|---|
| 9,712,374 B1* | 7/2017 | Cao | H04L 29/08072 |
| 2013/0114497 A1* | 5/2013 | Zhang | H04W 72/005 |
| | | | 370/312 |
| 2014/0195689 A1* | 7/2014 | Gill | H04L 67/2833 |
| | | | 709/226 |

OTHER PUBLICATIONS

Cvijetic, et al., "Defining Optical Software-Defined Networks (SDN): From a Compilation of Demos to Network Model Synthesis", OFC/NFOEC, Mar. 2013, 3 pages.

Kanonakis, et al., "Dynamic Software-Defined Resource Optimization in Next-Generation Optical Access Enabled by OFDMA-Based Meta-MAC Provisioning", Jul. 2013, pp. 2296-2306, Journal of Lightwave Technology, vol. 31, No. 14.

Li, et al., "Joint Bandwidth Provisioning and Cache Management for Video Distribution in Software-Defined Passive Optical Networks", OFC, Mar. 2014, 3 pages.

Liu, et al., "A Novel In-Building Small-Cell Backhaul Architecture for Cost-Efficient Multi-Operator Multi-Service Coexistence", OFC/NFOEC, Mar. 2013, 3 pages.

\* cited by examiner

NETWORK VIRTUALIZATION AND RESOURCE ALLOCATION FOR THE INTERNET OF THINGS

RELATED APPLICATION INFORMATION

This application claims priority to provisional application Ser. No. 62/062,986 filed on Oct. 13, 2014, incorporated herein by reference.

BACKGROUND

Technical Field

The present invention relates to optical networks, and, more particularly, to optical network virtualization and dynamic resource allocation for software-defined-networking (SDN) for the Internet of Things (IoT).

Description of the Related Art

As wireless transceivers are increasingly becoming embedded in arbitrary machines and devices (e.g. various smart mobile devices, household appliances, vehicles, distributed sensors, etc.), the resulting Internet of Things (IoT) paradigm, which enables high-speed, low-latency connectivity between these devices and the Internet is vital to provisioning new and important services. Due to the exponentially growing traffic volume and the need for low-latency transmission, mobile fronthaul and backhaul of traffic via optical fiber links is emerging as a leading connectivity solution in this space.

Recently, optical switching was introduced into the optical network so that different optical network topologies may be emulated using different optical switch settings. However, no dynamic resource allocation or optimization methods, traffic prioritization, or an on-demand/programmable way to control optical switch settings with a global network view are possible using conventional systems and methods. Moreover, there is a wide worldwide variability in deployed fiber-optic fronthaul and backhaul network architectures and topologies, such that formulating and verifying universally-effective resource allocation and optimization algorithms becomes very difficult.

Furthermore, conventional systems and methods do not have the ability to differentiate between traffic flows according to their priority/importance and treat them accordingly (e.g., in current and/or future mobile fronthaul and backhaul networks). Conventional systems and methods also are not able to perform traffic prioritization or dynamic resource allocation/optimization functions in an on-demand/programmable way based on a global view of the end-to-end optical network for efficient network operation and monetization.

For example, methods for minimizing latency for arbitrary optical network architectures have been proposed, but they do not address bandwidth resource allocation/optimization or traffic prioritization; methods for an on-demand/programmable way to control optical device and switch settings with a global network view have been proposed, but do not address dynamic resource allocation/optimization or traffic prioritization; methods for dynamic bandwidth resource allocation/optimization have been proposed, but only for a fixed passive optical network (PON) topology; and methods for both dynamic bandwidth resource allocation/optimization and on-demand programmable operation have been proposed, but also only for a fixed PON topology.

SUMMARY

A computer-implemented method for network virtualization and resource allocation, including storing one or more received network requests in a request table, and updating at least one of a flow table, a waiting list table, or a candidate group map based on the one or more received network requests. The updating includes monitoring a transmission progress of each of one or more flows in a network of interconnected computing devices and moving completed flows from the flow table to a success list, moving requests in the waiting list table which have reached an attempt threshold from the flow table to a fail list, and compiling any residual requests in the waiting list with new requests to generate a new request table. A deterministic request allocation and/or an optimizing request allocation is performed based on the new request table.

A system for network virtualization and resource allocation, including a storage medium for storing one or more received network requests in a request table. An updater controls adjustment of at least one of a flow table, a waiting list table, or a candidate group map based on the one or more received network requests. The adjusting is performed by monitoring a transmission progress of each of one or more flows in a network of interconnected computing devices and moving completed flows from the flow table to a success list, moving requests in the waiting list table which have reached an attempt threshold from the flow table to a fail list, and compiling any residual requests in the waiting list with new requests to generate a new request table. A request allocator controls at least one of a deterministic request allocation or an optimizing request allocation based on the new request table.

A computer-readable storage medium including a computer-readable program, wherein the computer-readable program when executed on a computer causes the computer to perform the steps of storing one or more received network requests in a request table, and updating at least one of a flow table, a waiting list table, or a candidate group map based on the one or more received network requests. The updating includes monitoring a transmission progress of each of one or more flows in a network of interconnected computing devices and moving completed flows from the flow table to a success list, moving requests in the waiting list table which have reached an attempt threshold from the flow table to a fail list, and compiling any residual requests in the waiting list with new requests to generate a new request table. A deterministic request allocation and/or an optimizing request allocation is performed based on the new request table.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
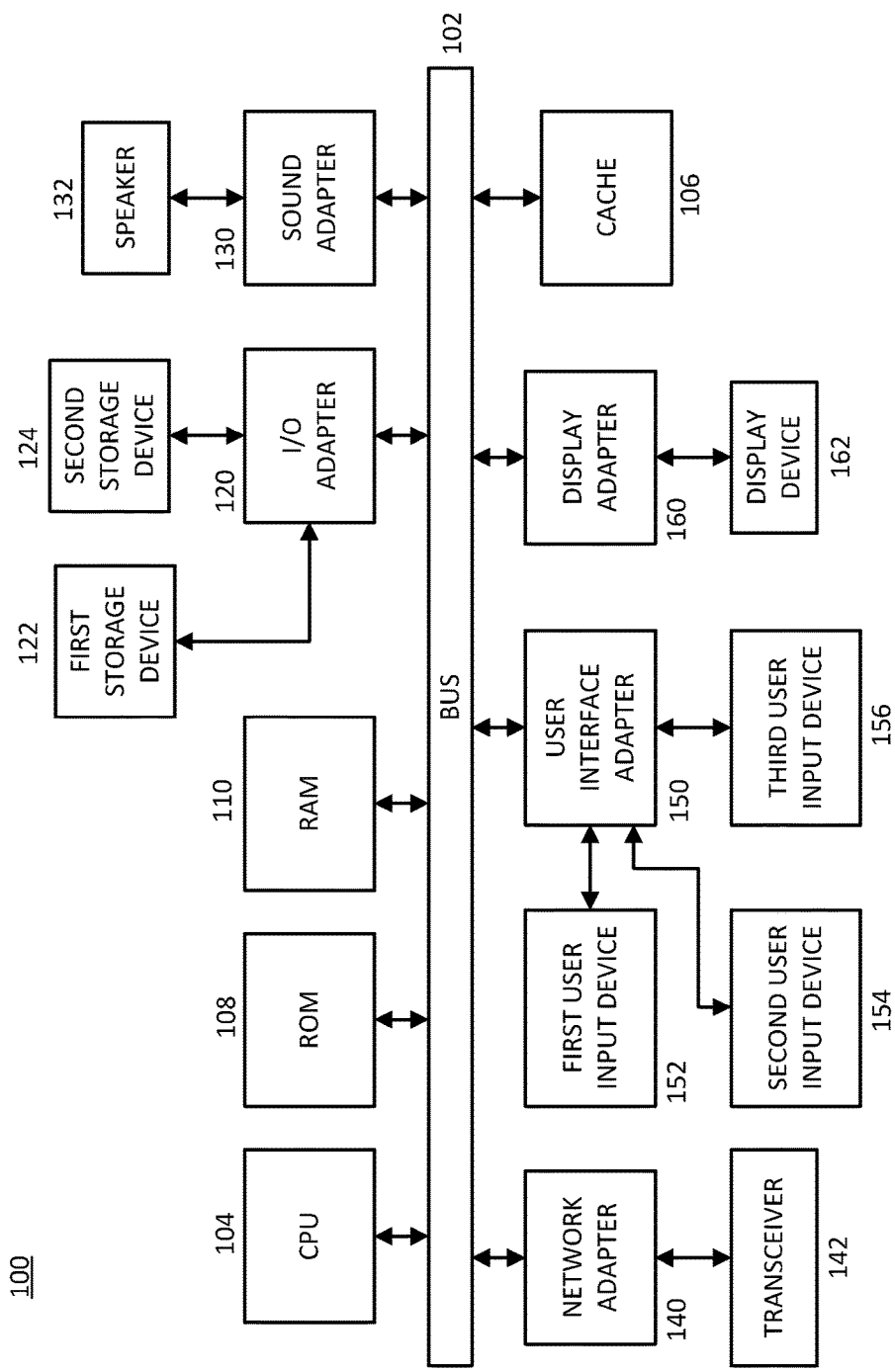
FIG. 1 shows an exemplary processing system to which the present principles may be applied, in accordance with an embodiment of the present principles.

The present principles provide a system and method for optical network virtualization to determine (e.g., abstract) physical differences in an underlying optical network topology/architecture. In a particularly useful embodiment, the underlying physical-layer connectivity may be abstracted by candidate group mapping (e.g., between remote and centralized network nodes), such that by changing the candidate group mapping, different physical-layer architectures (e.g. passive optical networks (PONs), point-to-point wavelength division multiplexing (WDM), hybrid architectures, etc.) may be treated within a single framework.

In one embodiment, for on-demand/programmable dynamic resource allocation (e.g., based on a given candidate group map), both a deterministic method and an optimization method, including one or more programmable features) may be employed according to the present principles. In both of the above methods (e.g., deterministic and optimization), examples of programmable aspects may include: (1) the candidate group (e.g., the connectivity model between the central and remote nodes); (2) the presence of absence of traffic multicasting (e.g., modeled as programmable on/off switch); (3) the presence or absence of ongoing data flow interruption (e.g., modeled as programmable on/off switch based on which incoming requests can/cannot interrupt existing flows); and/or (4) the overall objective that ought to be maximized by the algorithm (e.g., choose between maximizing bandwidth usage, traffic priority, or revenue) according to various embodiments.

In one embodiment, either (or both) of the above methods (e.g., deterministic or optimization) may be controlled using a centralized controller, and may include SDN-based decoupling of the control and data planes according to some embodiments. Thus, the present principles may be employed to overcome at least the deficiencies of the prior art described above. In one embodiment, the present principles may be employed to perform optical network virtualization enabling universally-effective dynamic resource allocation and optimization that does not depend on the underlying optical network architecture/topology. Furthermore, the dynamic resource allocation and optimization according to the present principles enable on-demand/programmable traffic prioritization based on a global view of the end-to-end optical network according to some embodiments.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that circuits/systems/networks 200, 300, 310, and 800 described below with respect to FIGS. 2, 3A, 3B, and 8 are circuits/systems/networks for implementing respective embodiments of the present principles. Part or all of processing system 100 may be implemented in one or more of the elements of systems 200, 300, 310, and 800 with respect to FIGS. 2, 3A, 3B, and 8.

Figure 6:
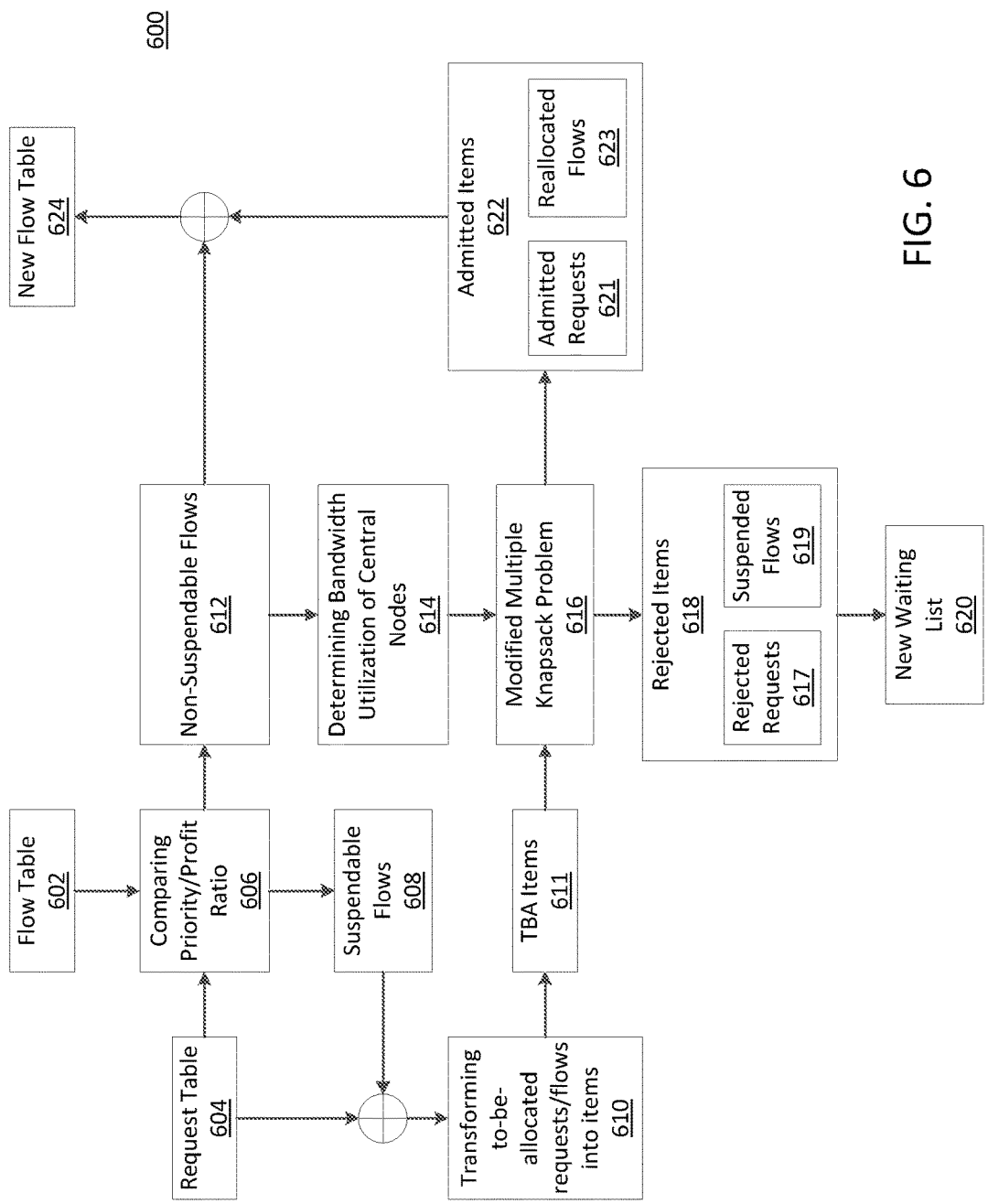
FIG. 6 shows an exemplary method for managing resource allocation to optimize overall network performance for one or more networks, in accordance with an embodiment of the present principles.

Further, it is to be appreciated that processing system 100 may perform at least part of the methods described herein including, for example, at least part of method 600 of FIG. 6. Similarly, part or all of circuits/systems/networks 200, 300, 310, and 800 of FIGS. 2, 3A, 3B, and 8 may be used to perform at least part of the methods described herein including, for example, at least part of method 600 of FIG. 6.

Figure 2:
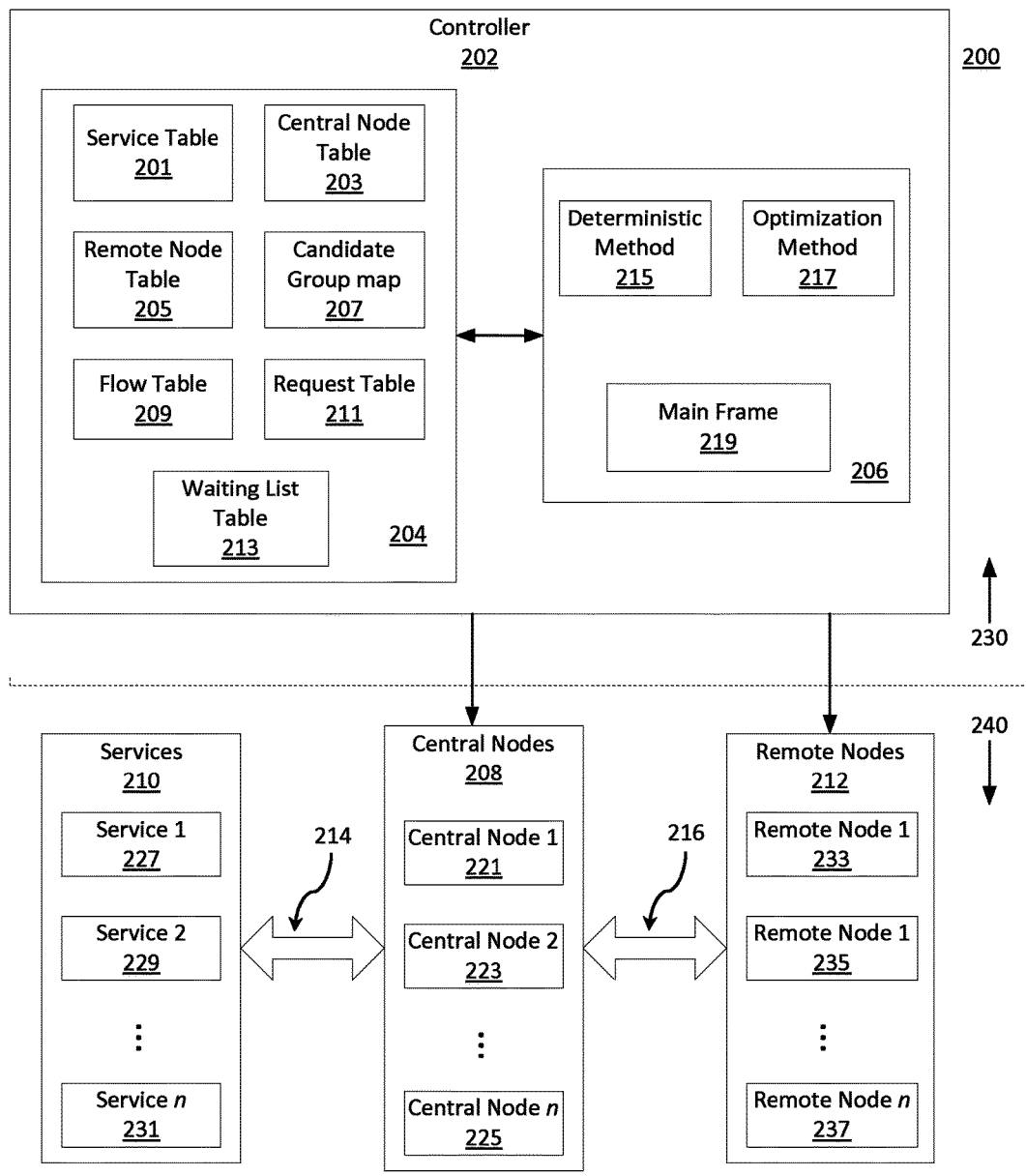
FIG. 2 shows an exemplary system/method for network virtualization and resource allocation for one or more networks using one or more software-defined-networking (SDN) controllers, in accordance with an embodiment of the present principles.

Referring now to FIG. 2, an exemplary system/method 200 for network virtualization and resource allocation for one or more networks using one or more software-defined-networking (SDN) controllers is illustratively depicted in accordance with an embodiment of the present principles. In one embodiment, a controller 202 (e.g., centralized SDN-based controller) may be employed to link multiple services 227, 229, and 231 on a cloud end (e.g., services) 210 to a set of remote users, which may be abstracted by the system/method according to the present principles into a pool of remote nodes 212 (e.g., physical computing machines, virtual machines, etc.), which may include one or more remote nodes 233, 235, and 237. In some embodiments, the controller 202 may include memory 204, 206 for storing data.

In one embodiment, to access the services 227, 229, and 231, the remote nodes 212 may request service access from the cloud end 210 (e.g., services) via one or more central nodes 221, 223, and 225, which may be all or a portion of the overall central nodes 208. Central nodes 208 may be virtualized (e.g., generated) by the controller 202, or may be physical computing devices according to various embodiments of the present principles. In some embodiments, a central node 221, 223, and 225 may be any physical resource block that can be shared among several remote nodes (e.g. bandwidth on one wavelength, fiber-optic link, etc.) The central nodes 208 may be interconnected to cloud-based services 227, 229, and 231 through, for example, an electrical interconnection fabric 214 (e.g., electrical switches).

In one embodiment, different remote nodes 233, 235, and 237 from a set of remote nodes 212 may request different services (e.g., 227, 229, and 231) from the set of services 210 (e.g., in the cloud) and the network is updated periodically, such that in each iterative update, remote nodes 233, 235, and 237 may generate and/or issue new requests, and the deterministic method 215 and/or the deterministic method 217 may be employed to use resources of the central nodes 208 to process the incoming requests to maximize a particular overall goal/objective (e.g. maximize the number of served requests, maximize the bandwidth usage, maximize the served priority, maximize the revenue, etc.).

As such, in some embodiments, remote nodes 233, 235, and 237 may issue new requests during each round, and each request may have a particular priority, require a certain bandwidth, a certain profit ratio, and may needs to be satisfied subject to a set of underlying physical-layer optical connectivity 216 constraints between the central node pool 208 and the remote node pool 212. In one embodiment, it may be assumed that each of the central nodes 221, 223, and 225; and each of the remote nodes 233, 235, and 237 may include one or more transmitters and/or receivers, and may transmit and/or receive on one or more optical wavelengths, depending on the underlying physical-layer connectivity 216.

In one embodiment, depending on the type of optical fabric 216 (e.g., the nature and degree of underlying physical-layer wavelength tunability and/or fiber-optic connectivity), the methods 215 and/or 217 may be applied to completely disparate physical-layer architectures (e.g., wavelength division multiplexed (WDM)-based PON, point-to-point non-WDM links, etc.). In one embodiment, the controller 202 may be located in the control plane 230 and the services 210 and nodes 208, 212 may be located in the data plane 240.

In various embodiments, the controller 202 may generate and store one or more tables and/or maps in a physical storage medium 204. The generated tables and/or maps may include, for example, a service table 201, a central node table 203, a remote node table 205, a candidate group map 207, a flow table 209, a request table 211, and/or a waiting list table 213 in accordance with the present principles, although other tables may be generated and stored according to various embodiments. The generated tables and/or maps will be described in further detail herein below.

In one embodiment, an illustrative example of a candidate group map 207 and a remote node table 205 (e.g., for a Wavelength Division Multiplexing-Passive Optical Networks (WDM-PON) architecture) may be represented by the following table:

TABLE 1

| Remote | Central | | | | | | | | Remotes | Candidate group |
| --- | --- | --- | --- | --- | --- | --- | --- | --- | --- | --- |
| | C[1] | C[2] | C[3] | C[4] | C[5] | ... | C[m-2] | C[m-1] | C[m] | | |
| R[1] | ✓ | ✓ | X | ✓ | X | | X | X | X | R[1] | C[1], C[2], C[4] |
| R[2] | X | ✓ | ✓ | X | X | | X | X | X | R[2] | C[2], C[3] |
| R[3] | X | X | ✓ | ✓ | ✓ | | X | X | X | R[3] | C[3], C[4], C[5] |
| R[4] | ✓ | X | X | X | ✓ | | X | X | X | R[4] | C[1], C[5] |
| R[5] | X | X | X | ✓ | X | | X | X | X | R[5] | C[4] |
| ... | | | | ... | | | | | | ... | ... |
| R[n-1] | X | X | X | X | X | | ✓ | ✓ | ✓ | R[n-1] | C[m-2], C[m-1] |
| R[n] | X | X | X | X | X | ... | ✓ | ✓ | ✓ | R[n] | C[m-2], C[m-1], C[m] |

The candidate group map is represented on the left side of the arrow, and the remote node table is represented on the right side of the arrow in the above table. The symbol ✓ indicates that there is connectivity between the corresponding central and remote nodes, and X indicates that there is no connectivity. The remote node table 205 may correspond to the candidate map 207, and may record and store the candidate group for each remote node 233, 235, and 237 according to the present principles. In the above table, central nodes 208 and remote nodes 212 are denoted by C[i] and R[j], respectively, where i=1, 2, . . . , m and j=1, 2, . . . , n are positive integers.

In one embodiment, for the SDN controller 202 to maximize the overall objective value in the presence of limited optical connectivity and central node 208 resource constraints, the incoming requests from remote nodes 212 to services (e.g, in the cloud) 210 may be mapped to central nodes 208 efficiently according to the present principles. In one embodiment, the mapping may be performed in a programmable way that features several levels of dynamic programmability. For example, the present principles may employ programmable aspects including: the candidate group mapping 207 (e.g., the connectivity model between the central and remote nodes in Table 1, the presence or absence of traffic multicasting (e.g., modeled as a programmable on/off switch), the presence or absence of ongoing data flow interruption (e.g., modeled as a programmable on/off switch based on which incoming requests can/cannot interrupt existing flows), and the overall objective that may be maximized by the system/method 200 according to the present principles. In one embodiment, the overall objective may be employed to maximize, for example, the number of served requests, bandwidth usage, served traffic priorities, and/or revenue.

In one embodiment, after determining the topology-based candidate group map 207, the SDN controller 202 may compile a set of network state tables (e.g., service table 201, central node table 203, and/or remote node table 205). These tables may be generated to capture the "big picture" (e.g., overall network node architecture) in table format, and in addition to capturing the candidate group map 207, they also may include other important information including, for example, bandwidth requirements, total data size of each service request, real-time vs. non-real-time nature of each service, and overall data capacity of each central node 221, 223, and 225 according to various embodiments.

In one embodiment, an illustrative example of a service table 201 (e.g., for a Wavelength Division Multiplexing-Passive Optical Networks (WDM-PON) architecture) may be represented by the following table:

TABLE 2

| Service ID | Real-time/Non-real-time | Data rate (Mb/s) | Data size (Mb) |
| --- | --- | --- | --- |
| S[1] | R | 50 | 2000 |
| S[2] | N | 40 | 1500 |
| S[3] | R | 30 | 1200 |
| S[4] | N | 20 | 700 |
| ... | ... | ... | ... | where R denotes real time, N denotes non-real time, and services are denoted by S[k], where k=1, 2, . . . , K, where K is a positive integer.

In one embodiment, an illustrative example of a central node table 203 (e.g., for a Wavelength Division Multiplexing-Passive Optical Networks (WDM-PON) architecture) may be represented by the following table:

TABLE 3

| Central node ID | Available bandwidth (Mb/s) |
| --- | --- |
| C[1] | 400 |
| C[2] | 600 |
| ... | ... |
| C[m − 1] | 500 |
| C[m] | 300 |

In one embodiment, Tables 2 and 3 may illustrate how the network architecture and service pool of the network may be abstracted into table format by the SDN controller 202. As shown in Table 2, the service table 201 may include four fields (e.g., tuples), for recording the service identification (ID), real-time/non-real-time nature, data rate, and total data size of each service 227, 229, and 231. In one embodiment, the central node table 203 may captures the unique IDs of the central nodes 221, 223, and corresponding available bandwidth resources. In one embodiment, the remote node table 205 (illustrated in Table 1) may capture the candidate group map 207 between the central 208 and remote nodes 212 according to the present principles.

In some embodiments, dynamic tables may be generated and employed for managing flows and requests. The dynamic tables may include a flow table 209, a request table 211, and/or a waiting list table 213 according to various embodiments.

In one embodiment, an illustrative example of a flow table 209 (e.g., for a Wavelength Division Multiplexing-Passive Optical Networks (WDM-PON) architecture) may be represented by the following table:

TABLE 4

| Flow ID | Service ID | Central node ID | Remote node ID | Priority | Data rate | Profit ratio | Progress |
|---|---|---|---|---|---|---|---|
| 0001 | S[1] | C[1] | R[4] | 9 | 50 | 0.18 | 0.20 |
| 0002 | S[1] | C[2] | R[1] | 5 | 50 | 0.10 | 0.25 |
| 0003 | S[1] | C[2] | R[2] | 3 | 50 | 0.06 | 0.25 |
| 0004 | S[2] | C[3] | R[3] | 4 | 40 | 0.10 | 0.3 |
| 0005 | S[2] | C[4] | R[1] | 2 | 40 | 0.05 | 0.05 |
| 0006 | S[3] | C[5] | R[4] | 8 | 30 | 0.267 | 0.6 |
| 0007 | S[4] | C[4] | R[3] | 1 | 20 | 0.05 | 0.12 |
| 0008 | S[4] | C[4] | R[5] | 6 | 20 | 0.30 | 0.12 |
| ... | | | | | | | |

In one embodiment, the flow table 209 may include, for example, the flow ID, service ID (e.g., flow source), central node ID (e.g., via point), and remote node ID (e.g., flow destination), as well as several key properties of a flow. These properties may include, for example, the flow priority, data rate, profit ratio, and transmission progress. Profit ratio may be defined as the ratio between the profit of a flow and the bandwidth (data rate) it requires, and the profit may be measured by the served priority, revenue, etc., depending on the overall objective value to be maximized. In each round, remote nodes 212 may issue new requests, and these new requests may be added to the request table 211, along with any unserved requests from previous rounds that already reside in the waiting list table 213.

In one embodiment, an illustrative example of a request table 211 (e.g., for a Wavelength Division Multiplexing-Passive Optical Networks (WDM-PON) architecture) may be represented by the following table:

TABLE 5

| Request ID | Service ID | Remote node ID | Priority | Data rate | Profit ratio | Progress | Attempt count |
|---|---|---|---|---|---|---|---|
| 0013 | S[1] | R[5] | 3 | 50 | 0.06 | 0.4 | 1 |
| 0014 | S[2] | R[2] | 6 | 40 | 0.15 | 0 | 0 |
| 0015 | S[3] | R[1] | 2 | 30 | 0.067 | 0.15 | 3 |
| 0016 | S[3] | R[5] | 5 | 30 | 0.167 | 0 | 1 |
| 0017 | S[4] | R[2] | 4 | 20 | 0.20 | 0.3 | 2 |
| 0018 | S[4] | R[4] | 1 | 20 | 0.05 | 0.65 | 4 |
| ... | | | | | | | |

In one embodiment, the request table 211 may capture two key features of a request, including, for example, the requested service ID (e.g., flow source) and the requesting remote node ID (e.g., flow destination), as well as other properties, including, for example, request priority, data rate, profit ratio, transmission progress, and/or attempt count according to various embodiments.

In one embodiment, an illustrative example of a waiting list table 213 (e.g., for a Wavelength Division Multiplexing-Passive Optical Networks (WDM-PON) architecture) may be represented by the following table:

TABLE 6

| Request ID | Service ID | Remote node ID | Priority | Data rate | Profit ratio | Progress | Attempt count |
|---|---|---|---|---|---|---|---|
| 0009 | S[1] | R[3] | 1 | 50 | 0.02 | 0.1 | 4 |
| 0010 | S[2] | R[4] | 2 | 40 | 0.05 | 0 | 2 |
| 0011 | S[3] | R[2] | 3 | 30 | 0.10 | 0.4 | 1 |
| 0012 | S[4] | R[1] | 1 | 20 | 0.05 | 0.15 | 3 |
| ... | | | | | | | |

In one embodiment, the waiting list table 213 may store unserved requests from previous rounds, and may have exactly the same tuples as the request table 211. When a request is admitted as a flow, it may be moved from the request table 211 to the flow table 209. Likewise, when a flow is suspended and becomes a request, it may be moved from the flow table 209 to the request table 211. In the flow table 209, request table 211, and waiting list table 213, each flow/request may have a unique identification, which may be inherited when a request is admitted as a flow or a flow is suspended and becomes a request. Other inherited tuples may include, for example, the service ID, remote node ID, priority, and progress. In some embodiments, there may be a limitation on the number of attempts each service can make to be admitted, and if a request cannot get admitted within the limited attempt count, it may be rejected permanently and eliminated from the request table 211 and waiting list table 213 according to the present principles.

In one embodiment, the SDN controller 202 may be employed to define the interaction between the above tables. For example, the controller 202 may define which on-going flows can keep running without suspension, which flows can continue transmission but use different central node resources 208, and which flows must be suspended and go to the waiting list 213. The controller 202 may also determine which new requests can be admitted as flows into the flow table 209, and which requests cannot be admitted and must wait in the waiting list 213 according to various embodiments of the present principles.

In one embodiment, the SDN controller 202 may employ different methods to govern the detailed interaction between the request 211 and flow 209 tables. For example, a first method may be a deterministic method 215, and a second method may be formulated as an optimization problem 217. In one embodiment, the SDN controller 202 can adopt either the deterministic 215 or the optimization 217 method as the kernel of the mainframe 219 of the controller. The flow 209, request 211 and waiting list 213 tables may be compiled identically for both the deterministic 215 and optimization 217 methods. A difference between the two methods may lie in the exact interaction between request and flow tables, such that the two methods differ from each other in deciding which flows are to continue, which flows have to be suspended, which requests can be admitted, and which requests must be rejected according to various embodiments of the present principles.

Figure 3A:
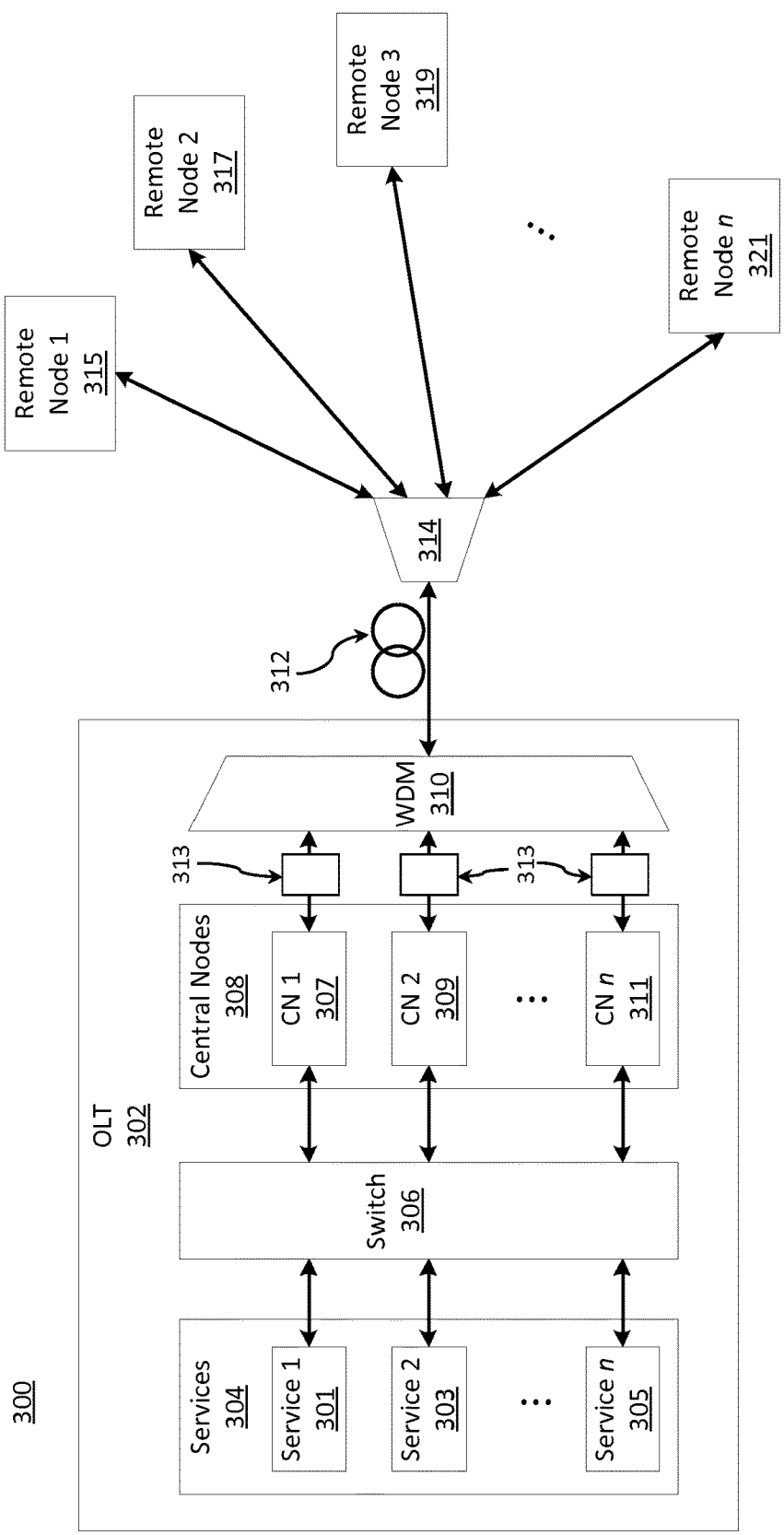
FIG. 3A shows an exemplary system/method for managing one or more Wavelength Division Multiplexing-Passive Optical Networks (WDM-PONs) using one or more software-defined-networking (SDN) controllers, in accordance with an embodiment of the present principles.

Referring now to FIG. 3A, an exemplary system/method 300 for managing one or more Wavelength Division Multiplexing-Passive Optical Networks (WDM-PONs) using one or more software-defined-networking (SDN) controllers is illustratively depicted in accordance with an embodiment of the present principles. In one embodiment, a services pool 304, including one or more services 301, 303, and 305 (e.g., $N_s$ services) may be employed, and the service pool 304 may be located in the cloud according to the present principles.

In one embodiment, the system/method 300 may abstract one or more WDM-PONs into a central node/remote node architecture. The central node/remote node architecture may include, for example, a set of central nodes 308, which may include one or more central nodes 307, 309, and 311 (e.g., physical computing devices, virtual machines/terminals, etc.) and one or more remote nodes 315, 317, 319, and 312 (e.g., physical computing devices, virtual machines/terminals, etc.) according to the present principles. Services 304 may pass through an electrical switch 306 when being sent to the central nodes 308 within an optical line terminal (OLT) 302. It is noted that although the above nodes are illustratively depicted, the present principles may be applied to any number of nodes and networks according to various embodiments.

In one embodiment, the system 300 may include a WDM-based PON architecture, where the available bandwidth on each wavelength may be virtualized as a central node 308, and each optical network unit (ONU) may be modeled as a remote node 315, 317, 319, and 321. Since each ONU may features a variable degree of wavelength tunability, each remote node 315, 317, 319, and 321 can connect to a particular number of central nodes. The system may include one or more WDM multiplexers 310, fiber and a passive optical splitters 312, electrical-optical (E/O) splitters 313, and coarse wavelength division multiplexers 314 according to some embodiments.

In one embodiment, the available bandwidth on each wavelength may be virtualized as an instance of a central node 307, 309, and 311, and the optical network units (ONUs) may behave as remote nodes 315, 317, 319, and 321. Due to the constrained wavelength tunability of ONUs 315, 317, 319, and 321 according the present principles. The remote nodes 315, 317, 319, and 321 may include optical-to-electrical (O/E) converters and receivers according to some embodiments.

Figure 3B:
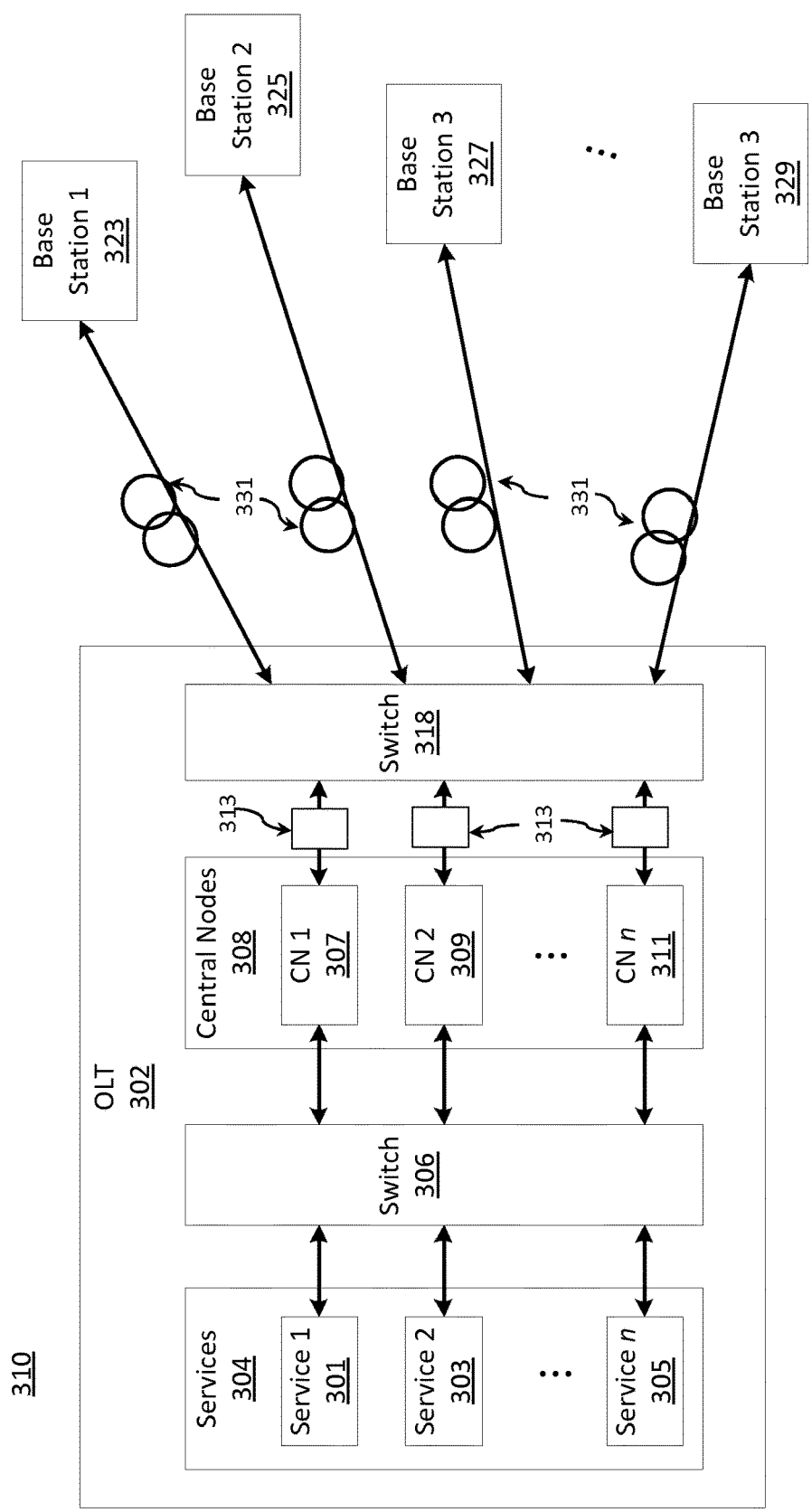
FIG. 3B shows an exemplary system/method for managing one or more point-to-point non-Wavelength Division Multiplexing (WDM) networks using one or more software-defined-networking (SDN) controllers, in accordance with an embodiment of the present principles.

Referring now to FIG. 3B, with continued reference to FIG. 2, an exemplary system/method 310 for managing one or more point-to-point non-Wavelength Division Multiplexing (WDM) networks using one or more software-defined-networking (SDN) controllers is illustratively depicted in accordance with an embodiment of the present principles. In one embodiment, a services pool 304, including one or more services 301, 303, and 305 (e.g., $N_s$ services) may be employed, and the service pool 304 may be located in the cloud according to the present principles. Services 304 may pass through an electrical switch 306 when being sent to the central nodes 308, and signals may be converted from electrical to optical using one or more E/O converters 313 within an optical line terminal (OLT) 302.

In one embodiment, the system 310 may include a point-to-point non-Wavelength Division Multiplexing (WDM) based architecture, where the available bandwidth on each wavelength may be virtualized as a central node 308, and each optical network unit (ONU) may be modeled as a remote node 323, 325, 327, and 329. In some embodiments, these remote nodes 323, 325, 327, and 329 may be base stations. Since each ONU may feature a variable degree of wavelength tunability, each remote node 323, 325, 327, and 329 can connect to a particular number of central nodes. The system may include one or more electrical switches 306, optical switches 318, E/O converters 313, coarse wavelength division multiplexers 314, and fiber 331 according to various embodiments. The remote nodes 323, 325, 327, and 329 may include optical-to-electrical (O/E) converters and receivers according to some embodiments.

In one embodiment, the system/method 310 may a physical point-to-point non-WDM network, where the fiber-optic connectivity fabric 331 between central nodes 308 and base stations/remote nodes 323, 325, 327, and 329 may be realized and constrained by an optical switch 318. It is noted that in FIG. 3A, the remote nodes 323, 325, 327, and 329 are illustrated as base stations (BS), but may be any type of remote nodes (e.g., ONUs without loss of generality) according to embodiments of the present principles.

In various embodiments, regardless of the specific fiber-optic connectivity type between elements of the system 310, all restrictions in the underlying physical-layer wavelength tunability/optical connectivity fabric 331 between remote nodes 323, 325, 327, and 329 and central nodes 307, 309, and 311 may be translated and transformed to the candidate group mapping 207 of FIG. 2, which will be described in further detail herein below. The candidate group map 207 may be employed to determine which remote nodes/base stations 323, 325, 327, and 329 may be connected to which central nodes 307, 309, and 311 (e.g., regardless of the specific underlying physical-layer connectivity fabric 331) for network virtualization/abstraction according to the present principles.

Figure 4:
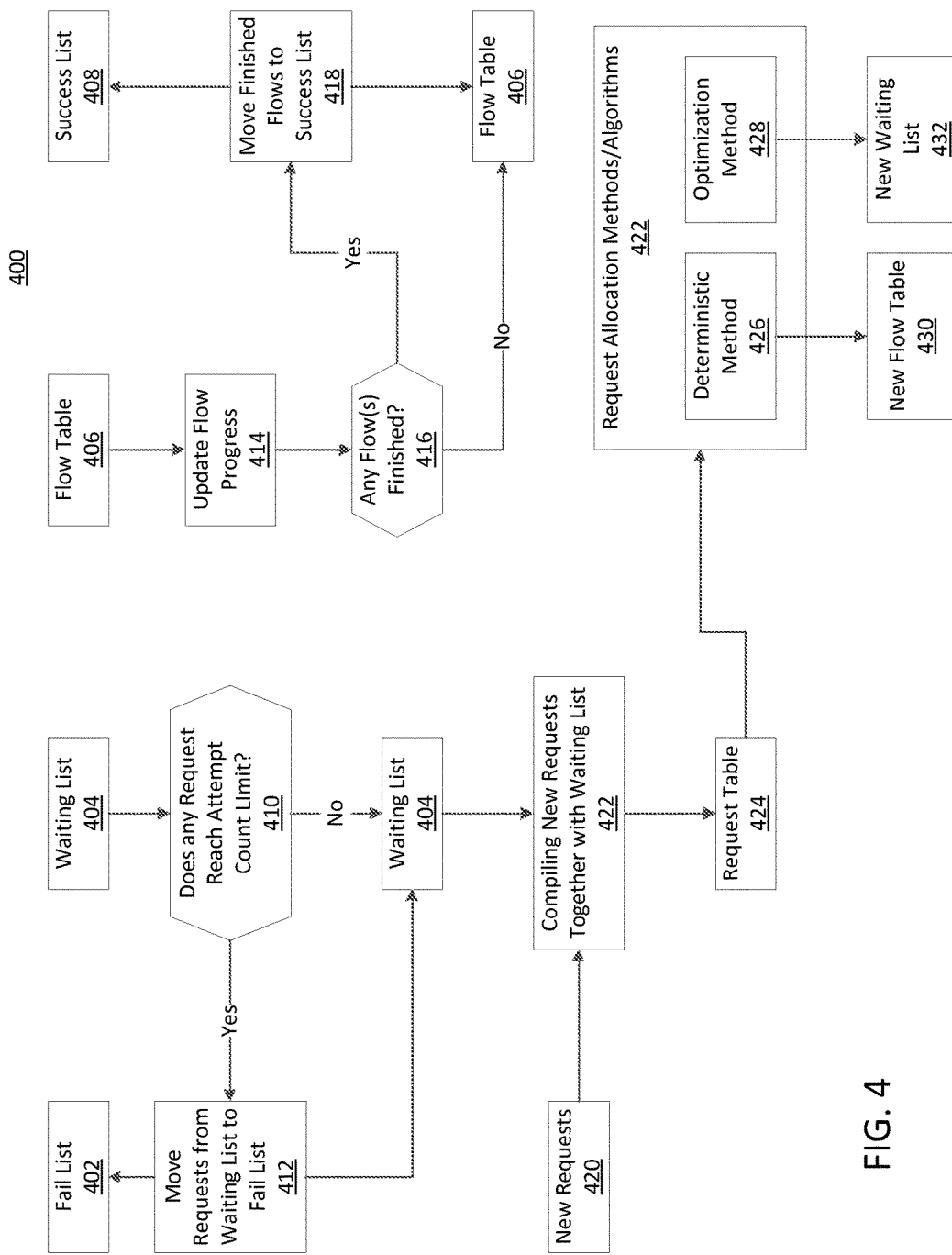
FIG. 4 shows an exemplary method for managing one or more networks by controlling interaction of dynamic tables and allocation requests, in accordance with an embodiment of the present principles.

Referring now to FIG. 4, with continued reference to FIG. 2, an exemplary method 400 for managing one or more networks by controlling interaction of dynamic tables and allocation requests is illustratively depicted in accordance with an embodiment of the present principles. In one embodiment, FIG. 4 illustrates the detailed interaction between the network state tables 201, 203, and 205, the dynamic tables 209, 211, and 213, and the methods (e.g., deterministic, optimization) performed by the controller 202.

In one embodiment, in each round, the main frame 219 of the SDN controller 202 may update the status of the flow table 406 and the waiting list table 404, and may prepare them as inputs for the deterministic 426 or optimization 428 methods. To update the flow table 406, the controller may update the transmission progress of each flow in block 414, determine and/or record flows that have reached the end of their transmission in block 416, and may move them in block 418 from the flow table 406 to the success list 408, where all finished flows may be stored according to the present principles.

In one embodiment, to update the waiting list table 404, the SDN controller 202 may first locate requests in the waiting list 404 that have reached the predefined attempt count limit in block 410, and may remove them from the waiting list 404, and may add them to the fail list in block 412, and permanently rejected requests may be stored in the fail list in block 402. In one embodiment, the controller may then compile 422 residual requests in the waiting list 404 with new requests 420 to generate the request table 424 according to the present principles.

In one embodiment, request allocation methods 422 may include two different methods (e.g., deterministic 426 and optimization 428 methods), and both methods may receive the request table 424 and flow table 406 as inputs, and may generate a new flow table 430 and new waiting list 432 as outputs. It is noted that the flow, request and waiting list tables may be dynamic and may evolve during the performance of the method 400 according to various embodiments of the present principles.

Figure 5:
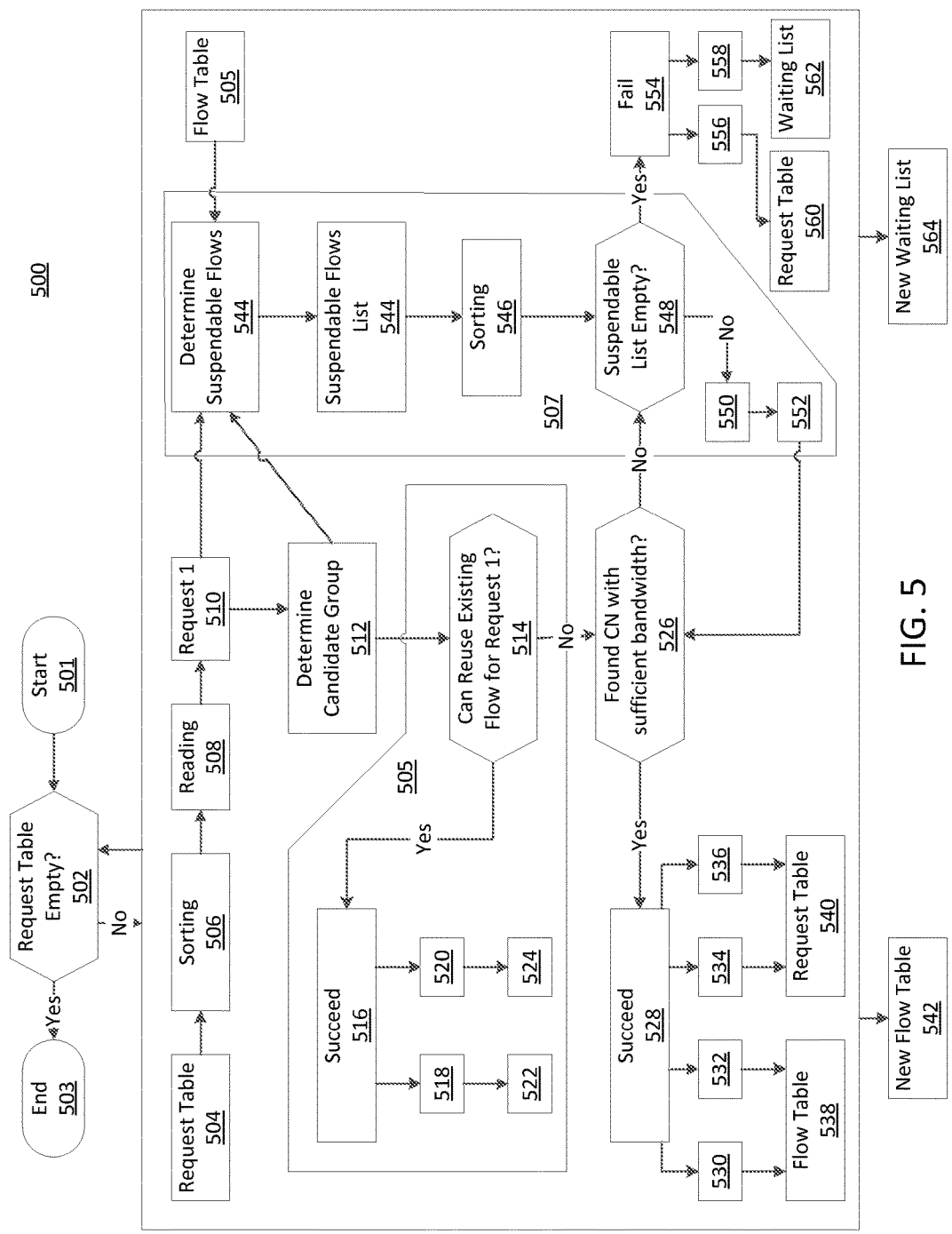
FIG. 5 shows an exemplary method for managing resource allocation for one or more networks using a deterministic method, in accordance with an embodiment of the present principles.

Referring now to FIG. 5, with continued reference to FIG. 2, an exemplary method 500 for managing resource allocation for one or more networks using a deterministic method is illustratively depicted in accordance with an embodiment of the present principles. In one embodiment, the controller 202 may start the method in block 501, and determine whether a request table 504 is empty in block 502. If the request table is empty, the method may end in block 503.

In one embodiment, if the request table 504 is determined to not be empty in block 502, the deterministic method 500 may first sort requests in descending order in block 506 (e.g., based on their priorities or the values of profit ratio depending on the metric that is to be maximized (e.g., number of served requests, bandwidth usage, served priorities, or revenue)), and may admit the highest-ranked requests first according to the present principles. For example, starting with the top-ranked request (e.g., request 1), the method 500 may determine a candidate group in block 512, may determine a list of suspendable flows in block 544 (e.g., which may exist in the same candidate group but have lower priorities/profit ratios than the incoming request, and receive a flow table as input in block 509), and may generate a list of suspendable flows in block 544 according to the present principles.

In one embodiment, the traffic multicasting feature 505 may enable the network to serve multiple requests simultaneously (e.g., by sharing a single copy of bandwidth resource in central nodes). The suspendability feature 507 may enable on-going flows to be suspended (e.g., so that more important incoming requests can cut in and exploit the bandwidth resource released by the suspended flows). With multicasting 505 enabled, the present principles may be employed to first serve a request without consuming any additional bandwidth in the central nodes, and may determine whether a reusable flow carrying the requested service at the correct transmission progress exists in block 514. If yes, and this succeeds 516, the request may be admitted into the flow table in block 518 and a new flow table may be generated in block 522. In one embodiment, the request may be deleted from the request table in block 520, and a new request table may be generated in block 524 according to the present principles. Otherwise, the method may assign new bandwidth resource of central nodes in the candidate group to accommodate the request in block 526.

In one embodiment, if the multicasting feature 505 is disabled, the method 500 may skip the process of seeking reusable flows in block 514, and jump from block 512 to block 526 directly. If there exists a central node in the candidate group with enough bandwidth to accommodate the request in block 528, the request may be admitted in block 530 and removed from the request table in block 534. In one embodiment, suspended flows may be added to the request table in block 536 and may be deleted from the flow table in block 534, and new flow tables 538 and/or request tables 540 may be generated according to the present principles.

In one embodiment, if no central node is determined to be able to accommodate the request in block 528 and the suspendability feature is enabled in block 507, the present principles may be employed to suspend flows in the suspendable list to make space for the incoming request in block 324. If the suspendable list is determined to not be empty in block 548, the present principles may be employed to suspend the lowest-ranked in-progress flow in block 550 and may release its bandwidth resource in block 552. It is noted that the list of suspendable flows may also be sorted based on the decreasing order of priority/profit ratio in block 322. The method may iteratively continue suspending low-ranked in-progress flows until the incoming highly-ranked request can be accommodated in block 528, or the incoming request still cannot be admitted after all suspendable flows are suspended in block 554.

In one embodiment, in the case of a fail in block 544, the request may be moved from the request table in block 556 to the waiting list in block 558, and a new request table 560 and/or waiting list 562 may be generated. This iterative method (300) may be repeated for the next highest-ranked request according to the sorting of requests in block 506 until the request table is emptied determined to be empty in block 502, and the method 500 may then end in block 503.

In one embodiment, if the suspendability feature 507 is disabled, no existing flows may be suspended, so the suspendable list 544 for any request may always be empty, and the blocks within the suspendability feature 507 may be skipped. In some embodiments, the deterministic method 500 may be a greedy approximation of the optimization method 217 (e.g., because it gives instantaneous privilege to requests with higher metric values, seeking to accommodate highly-ranked requests first). The programmable parameters of the deterministic method 500 may include, for example, the presence or absence of traffic multicasting functionality in block 505, the presence or absence of flow suspendability in block 507, and/or the makeup of the candidate groups for each remote node. In one embodiment, the method 500 may generate a new flow table in block 542 and/or a new waiting list in 564, and may iteratively repeat if the request table is determined to not be empty in block 502 according to the present principles.

In one embodiment, enabling the multicasting feature 505 may affect the interaction between the request 504 and flow tables 509 because, with multicasting, multiple flows may share the same copy of bandwidth resource at a common central node. Consequently, when multicasting is disabled, the present principles may be employed to determine which central nodes in the candidate group of the incoming request that have enough available bandwidth to accommodate the request. When multicasting 505 is enabled, the method 500 may first check whether existing flows can be "re-used" to satisfy the incoming request, and new resource assignments may only occur if this "re-use" is not possible. It is noted that in both the case of reusing existing flows or assigning new resources, there may be zero, one, or several central nodes satisfying the target requirements.

In one embodiment, in the case of several reusable flow candidates, the deterministic method 500 may select to reuse the bandwidth resource corresponding to the flow with the highest priority/metric value. In the case of assigning new bandwidth resources, if there are several central node candidates, the deterministic method 500 may select the one with largest available bandwidth, such that traffic load is balanced among central nodes. In the optimization method 217 of FIG. 2, each central node candidate may be evaluated according to the overall objective function in order to select the candidate best suited to serve the incoming request, and the optimization method 217 will be described in further detail herein below.

Referring now to FIG. 6, with continued reference to FIGS. 2 and 5, an exemplary method 600 for managing resource allocation to optimize overall network performance for one or more networks is illustratively depicted in accordance with an embodiment of the present principles. In one embodiment, a goal of the optimization method 600 may be to optimize the overall performance metrics (e.g., number of served requests, total bandwidth usage, served priorities, and/or revenue) by considering all incoming requests together. In the deterministic method 500, on the other hand, optimization may be performed locally by considering requests one by one.

In one embodiment, input may be received from a flow table 602 and/or a request table 604, and by comparing the priority or metric values of incoming requests and existing flows in block 606, the present principles may be employed to differentiate in-progress flows into two categories: non-suspendable flows 612 and suspendable flows 608. The suspendable flows 608 may be compiled together with the request table 604 into a to-be-allocated list 611. Next, the request allocation problem may be transformed/abstracted in block 610 (e.g., into a modified 0-1 multiple knapsack problem (MKP)), in which requests and suspendable flows may be considered as items in block 610, central nodes may be considered as knapsacks in block 616, the bandwidth and the available bandwidth of each central node may be determined in block 614, and may be the volume of the knapsack, and each request may be defined as the volume of each item.

In one embodiment, the modified formulation of the 0-1 MKP 616 differs from the conventional version 0-1 MKP in two ways. First, with multicasting capability 507 enabled, not every item consumes volume in the knapsack since it can reuse the volume of existing items. Secondly, not every item may be placed into an arbitrary knapsack with sufficient available volume, but only into those knapsacks that belong to the underlying candidate group and also have sufficient available volume. The solution to the modified 0-1 MKP in block 616 may include admitted items 622 and rejected items 618. The admitted items 622 may include admitted requests 621 and/or reallocated flows 623, which, together with non-suspendable flows 612, may be employed to generate a new flow table 624 according to the present principles. The rejected items 618 may include suspended flows 619 and rejected requests 617, both of which may be moved into the new waiting list in block 620 according to various embodiments of the present principles.

In one embodiment, the MKP in block 616 each central node 208 may be considered as a knapsack, with its available bandwidth treated as the knapsack volume. The incoming requests in block 604 and the suspendable flows in block 608 may be treated as to-be-allocated items in block 610, and each may be associated with a remote node 212, and may only be allocated into a central node 208 within the candidate group 207 of that remote node. In one embodiment, the present principles may be employed to put these items into knapsacks, subject to the candidate group 507 constraints of each remote node 212, and the volume (e.g., bandwidth) limitation of knapsacks (e.g., central nodes 208) according to the present principles.

In one embodiment, the MKP in block 616 may be represented as follows:

Knapsacks (central nodes) $M=\{1, 2, \ldots, m\}$, each having capacity $c_i$ ($i \in M$)

TBA items (requests/flows) $N=\{1, 2, \ldots, n\}$, each having bandwidth $w_j$, profit $p_j$, and candidate group $S_j \subseteq M$ ($j \in N$)

$$\text{Maximize: } z = \sum_{i=1}^{m} \sum_{j=1}^{n} x_{ij} p_j$$

$$\text{Subject to: } \sum_{j=1}^{n} x_{ij} w_j \leq c_i, i \in M$$

$$x_{i,j} = 0 (i \notin S_j)$$

$$\sum_{i \in S_j} x_{ij} \leq 1, j \in N$$

Figure 7:
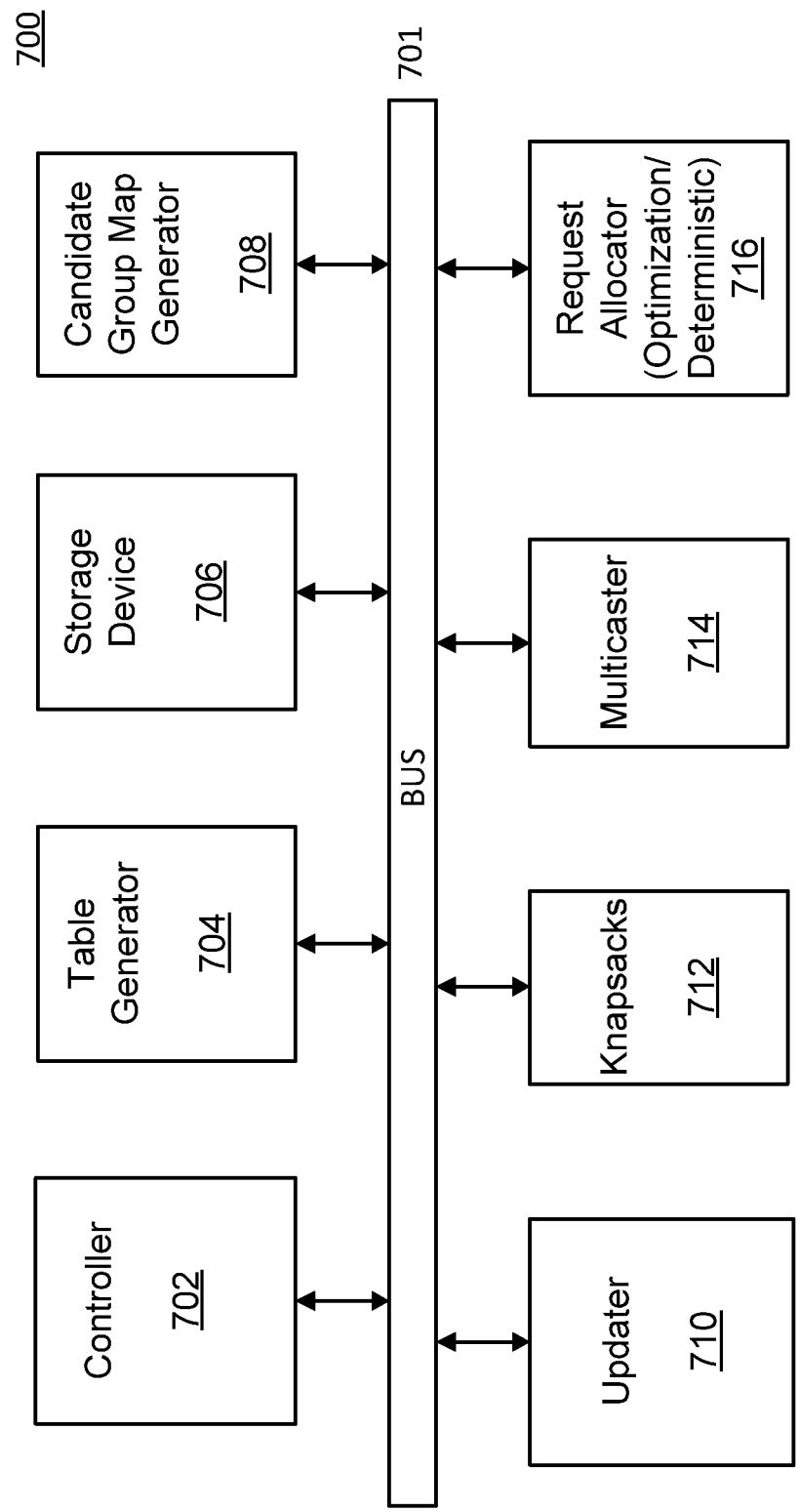
FIG. 7 shows an exemplary system for network virtualization and resource allocation for one or more networks using one or more software-defined-networking (SDN) controllers, in accordance with an embodiment of the present principles.

Referring now to FIG. 7, with continued reference to FIG. 2, an exemplary system for network virtualization and resource allocation for one or more networks using one or more software-defined-networking (SDN) controllers is illustratively depicted in accordance with an embodiment of the present principles.

While many aspects of system 700 are described in singular form for the sakes of illustration and clarity, the same can be applied to multiples ones of the items mentioned with respect to the description of system 700. For example, while a single knapsack 712 is illustratively depicted, more than one knapsack 712 may be used in accordance with the teachings of the present principles, while maintaining the spirit of the present principles. Moreover, it is appreciated that the knapsack 712 is but one aspect involved with system 700 than can be extended to plural form while maintaining the spirit of the present principles.

The system 700 may include a bus 701, a controller 702, a table generator 704, a storage device 706 a candidate group map generator 708, an updater 710, a knapsack 712, a multicaster 714 and/or a request allocator 716 according to various embodiments of the present principles.

In one embodiment, the controller 702 may be a SDN-based controller, and may be employed for management of other system elements, including, for example, the multicaster 714 and/or optimizer 716. In various embodiments, a table generator 704 may be employed to compile and collect data, and may generate one or more tables, including, for example, a service table 201, a central node table 203, a remote node table 205, a flow table 209, a request table 211, and/or a waiting list table 213 according to the present principles. A candidate group map generator 708 may be employed to compile and collect data, and may generate one or more candidate group maps 207 according to the present principles.

In one embodiment, an updater 710 may be employed to update one or more tables and/or mappings by, for example, compiling new requests, removing new requests from a waiting list, updating flow tables, updating candidate group maps, etc., and the updated tables and/or mappings may be stored in a storage device 706 according to the present principles. In one embodiment, one or more knapsacks 712 (e.g., central nodes) may be employed for separating to-be-allocated items (e.g., into separate knapsacks 712), subject to the candidate group constraints of each remote node 212 that are determined by the candidate group map generator 708.

In one embodiment a multicaster 714 may be employed to control the interaction between tables (e.g., request tables 211 and flow tables 209), as with multicasting, multiple flows may share a same copy of a bandwidth resource at a common central node 208. In one embodiment, a request allocator 716 may be employed to perform the deterministic method 215 and/or the optimization method 217 (as described above with reference to FIG. 2) according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer-implemented method for network virtualization and resource allocation, comprising:
    storing one or more received network requests in a request table;
    managing, using a hardware processor coupled to a memory, network flows and requests by dynamically updating a flow table, a waiting list table, and a candidate group map based on the one or more received network requests, the managing further comprising:
monitoring a transmission progress of each of one or more flows in a network of interconnected computing devices, and moving completed flows from the flow table to a success list;
moving requests in the waiting list table which have reached an attempt threshold from the flow table to a fail list;
compiling any residual requests in the waiting list with new requests to generate a new request table; and
minimizing bandwidth usage by enabling the network to serve a plurality of requests simultaneously by sharing a single copy of bandwidth resources in central nodes using multicasting; and
fulfilling at least one of a deterministic request allocation or an optimizing request allocation based on the new request table,
wherein if no central node is determined to be available to accommodate a highly ranked request, lower ranked in-progress flows are iteratively suspended until the highly ranked request is accommodated.

2. The method as recited in claim 1, wherein the deterministic request allocation further comprises sorting the requests based on at least one of request priorities or values of profit ratios.

3. The method as recited in claim 1, wherein the multicasting further comprising serving a request without consuming any additional bandwidth in one or more central nodes by locating one or more reusable flows carrying a requested service at a same transmission progress.

4. The method as recited in claim 1, further comprising suspending one or more in-progress flows to free-up bandwidth resources if higher priority incoming requests are received.

5. The method as recited in claim 4, further comprising generating a suspendable request list.

6. The method as recited in claim 5, wherein if the suspendable list is not empty, a lowest priority in-progress flow from the suspendable list is suspended to enable space for the higher priority incoming requests.

7. A system for network virtualization and resource allocation, comprising:
a hardware processor coupled to a storage medium for storing one or more received network requests in a request table, the hardware processor being configured to:
manage network flows and requests by controlling adjustment, using an updater, of a flow table, a waiting list table, and a candidate group map based on the one or more received network requests, the updater being further configured to:
monitor a transmission progress of each of one or more flows in a network of interconnected computing devices and move completed flows from the flow table to a success list;
move requests in the waiting list table which have reached an attempt threshold from the flow table to a fail list;
compile any residual requests in the waiting list with new requests to generate a new request table; and
minimize bandwidth usage by enabling the network to serve a plurality of requests simultaneously by sharing a single copy of bandwidth resources in central nodes using a multicaster; and
fulfill, using a request allocator, at least one of a deterministic request allocation or an optimizing request allocation based on the new request table,
wherein if no central node is determined to be available to accommodate a highly ranked request, lower ranked in-progress flows are iteratively suspended until the highly ranked request is accommodated.

8. The system as recited in claim 7, wherein the deterministic request allocation further comprises sorting the requests based on at least one of request priorities or values of profit ratios.

9. The system as recited in claim 7, wherein the multicaster serves a request without consuming any additional bandwidth in one or more central nodes by locating one or more reusable flows carrying a requested service at a same transmission progress.

10. The system as recited in claim 7, further comprising a controller for suspending one or more in-progress flows to free-up bandwidth resources if higher priority incoming requests are received.

11. The system as recited in claim 10, wherein a table generator is configured to generate a suspendable request list based on the one or more in-progress flows suspended by the controller.

12. The system as recited in claim 11, wherein if the suspendable request list is not empty, a lowest priority in-progress flow from the suspendable request list is suspended to enable space for the higher priority incoming requests.

* * * * *